United States Patent [19]

Richardson

[11] Patent Number: 4,797,563
[45] Date of Patent: Jan. 10, 1989

[54] POWER PLANT

[76] Inventor: Timothy M. Richardson, R.R. #3, Old Scone Mill, Chesley, Ontario, Canada, N0G 1L0

[21] Appl. No.: 77,358

[22] Filed: Jul. 24, 1987

[51] Int. Cl.<sup>4</sup> ............................................... F02C 3/12
[52] U.S. Cl. ........................................ 290/54; 290/43
[58] Field of Search ............................. 290/43, 52, 54

[56] References Cited

U.S. PATENT DOCUMENTS

| | | | |
|---|---|---|---|
| 3,797,234 | 3/1974 | Schwarz | 290/52 X |
| 3,831,373 | 8/1974 | Flynt | 290/52 X |
| 3,866,058 | 2/1975 | Lenssen | 290/52 |
| 3,869,857 | 3/1975 | Margen | 290/52 X |
| 3,939,356 | 2/1976 | Loane | 290/54 X |
| 4,307,299 | 12/1981 | Norton | 290/52 |

Primary Examiner—William M. Shoop, Jr.
Assistant Examiner—W. E. Duncanson, Jr
Attorney, Agent, or Firm—Rogers, Bereskin & Parr

[57] ABSTRACT

Electrical power is generated by means of an hydraulic air compressor that produces compressed air from a water stream. The compressed air is delivered directly to burners of a turbine without significant additional compression and after preheating using waste heat from the turbine exhaust. The turbine is used to drive a conventional electrical generator for producing power.

9 Claims, 5 Drawing Sheets

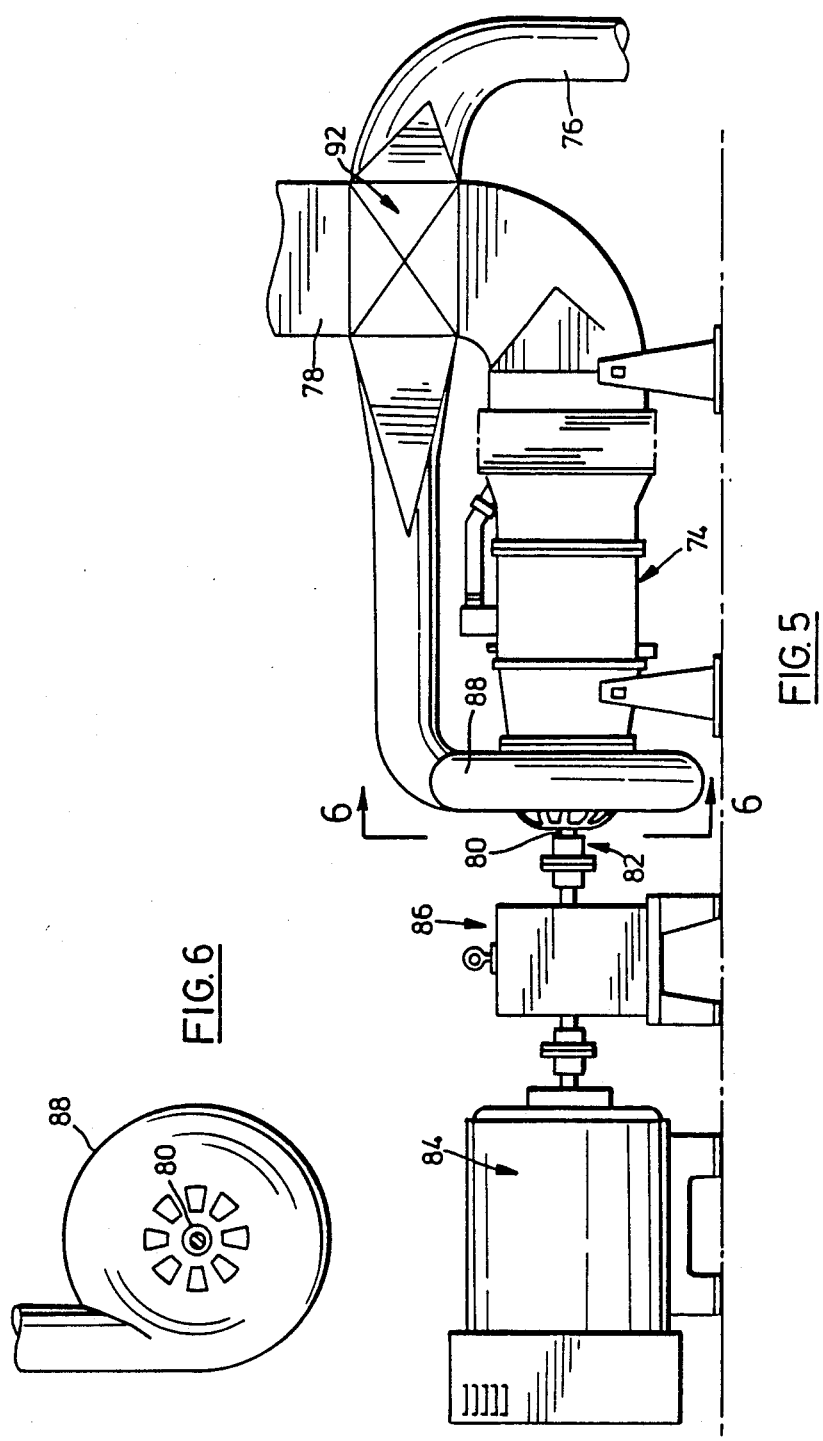

POWER PLANT

FIELD OF THE INVENTION

This invention relates generally to power plants for generating electricity. More specifically, the invention is concerned with a power plant that is capable of converting energy derived from a stream of water into electrical energy with the addition of energy from a supplementary fuel.

DESCRIPTION OF THE PRIOR ART

It has previously been proposed to use energy derived from a stream of water to generate compressed air. Hydraulic air compressors have been in existence since approximately 1890 when they were used throughout North America and in Europe to provide compressed air for mining camps. These plants operated for several years and were proven to be highly reliable in supplying high pressure compressed air for mining and industrial applications. The last commercial operation is believed to have been located at Colbalt, Ontario, Canada and to have been finally closed in 1981.

Hydraulic air compressors of the tyoe referred to are commonly known as "Taylor Hydraulic Air Compressors". Reference may be made to the following United Stated patents issued to Charles H. Taylor, namely Nos. 543,410, '411 and '412 all issued July 23, 1895 and entitled "Hydraulic Air Compressing Apparatus"; 618,243 issued Jan. 24, 1899 for "Hydraulic Air-Compressing Apparatus" and 892,772 issued July 7, 1908 for "Hydraulic Air Compressor".

An earlier patent of interest is U.S. Pat. No. 199,819 issued Jan. 29, 1878 to J. P. Frizell. This patent discloses a method of compressing air in which the air is introduced into a column of water descending through a shaft or pipe and is allowed to flow through a tunnel into and out of an ascending shaft or pipe.

Power plants having associated subterranean air storage reservoirs are disclosed by U.S. Pat. Nos. 3,643,426 (Janelid) issued Feb. 22, 1972; 3,797,234 (Schwartz) issued Mar. 19, 1974; 4,343,569 (Schwarzenbach) issued Aug. 10, 1982; and 4,391,552 (O'Hara) issued July 5, 1983.

SUMMARY OF THE INVENTION

In accordance with the invention there is provided a power plant that includes a hydraulic air compressor having a water intake in a stream of water at an upper level and a water outlet at a lower level in the stream. The intake is adapted to entrain air with water entering the intake. An air compression shaft is provided in the ground and communicates at its upper end with the intake, permitting the entrained air to be compressed by water moving downward in the shaft. An air separation and storage chamber in the ground communicates with a lower end of the shaft and allows air to bubble to the surface of the water and be trapped in the chamber above the water. A return shaft is provided for delivering water from the chamber to the water outlet in the water stream. The chamber has a compressed air outlet. The plant also includes a turbine having a compressed air inlet, burner means for heating the compressed air, an expansion chamber for receiving the heated compressed air, an exhaust air outlet downstream of the expansion chamber, and a rotary shaft carrying driven turbine blades. The blades are located in the expansion chamber for driving by hot gases expanding in the chamber. Means is provided for preventing water flow to the turbine in the event that water enters the air outlet of the hydraulic air compressor. Heat exchanger means is coupled between the turbine exhaust outlet and the air control means for preheating compressed air entering the compressed air inlet of the turbine. The plant also includes generator means coupled to the rotary turbine shaft.

As compared with a conventional industrial gas turbine, the turbine that is incorporated in the power plant provided by the invention does not include an air compression stage. Conventional industrial gas turbines use as much as two thirds of their generated shaft horsepower to drive an axial or centrifugal air compressor which supplies combustion air to the turbine combustion chambers. Turbine compression stages are notoriously inefficient while at the same time accounting for a substantial part of the total capital cost of the turbine. In the invention, therefore, not only is the capital cost of the turbine substantially reduced as compared with an equivalent conventional turbine but the overall efficiency of the turbine is improved. Since the hydraulic air compressor will preferably supply all of the combustion air at an appropriate pressure and the driven turbine blades will still produce their full rated power, it is anticipated that the turbine will be rated at two or three times the normal rating of a corresponding conventional turbine.

An hydraulic air compressor can be adapted to both "high head" sites; that is, sites in which there is a signficant vertical drop between the water intake and the water outlet (such as a water fall), as well as to "low head" sites (e.g. a river bed having a gradual drop or a small rapid). As will be described later, the compressor may incorporate relatively long underground tunnels which means that the water can be carried a long distance underground if necessary, bypassing long rapids or gradual drops without substantial losses of head.

Since the plant derives its energy from the compression of air rather than from the passage of water through a turbine, the need for large dams is avoided and many sites that would have been impossible to use as conventional water power sites become available. Negative impacts of dam constructions such as land flooding or blockage of migratory fish and large capital cost are avoided.

BRIEF DESCRIPTION OF THE DRAWINGS

In order that the invention may be more clearly understood, reference will now be made to the accompanying drawings which illustrate a number of preferred embodiments of the invention by way of example, and in which:

FIG. 5 is a side elevational view of the turbine and generator of the plant;

FIG. 6 is a sectional view on line 6—6 of FIG. 5;

DESCRIPTION OF THE PREFERRED EMBODIMENTS

Figure 1:
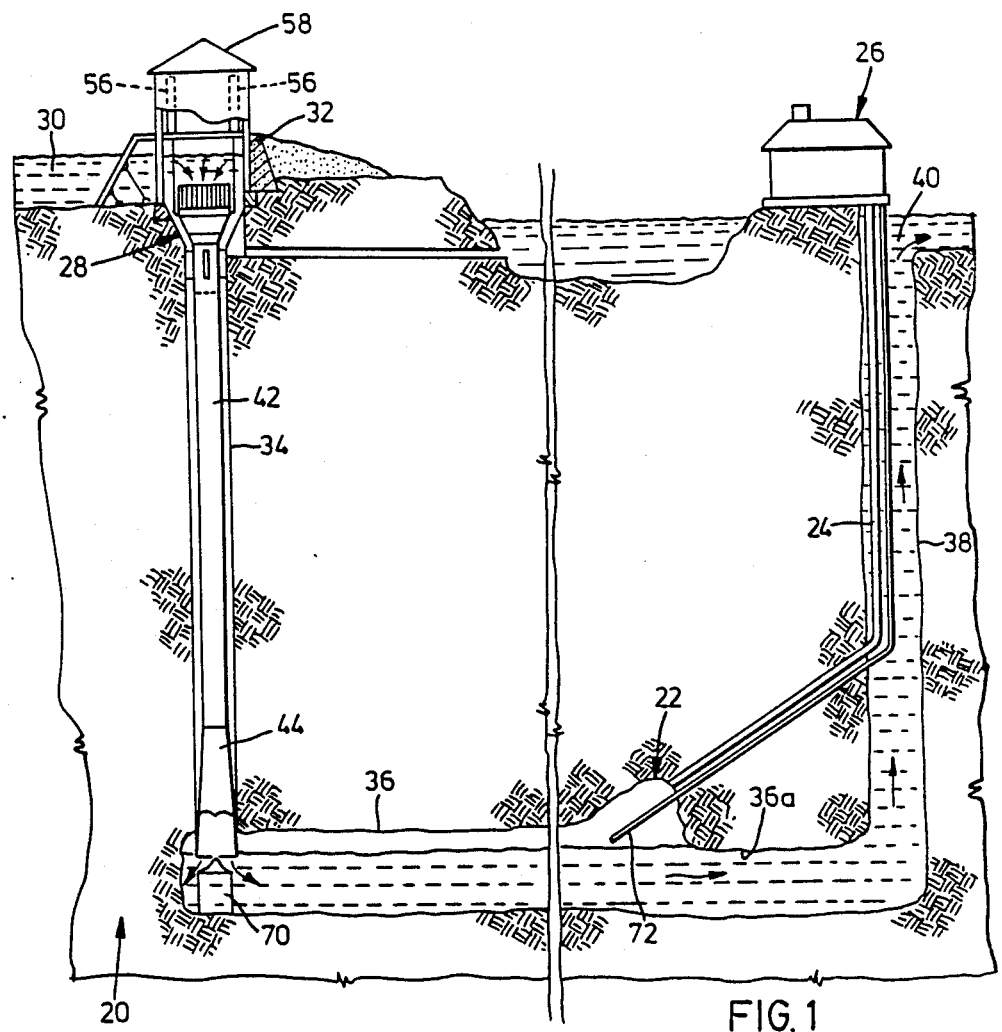
FIG. 1 is a vertical sectional view showing the general lay-out of a power plant in accordance with the invention.

Referring first to FIG. 1, a hydraulic air compressor is generally denoted by reference numeral 20 and includes a subterranean air separation and storage chamber 22 from which compressed air is conducted along a pipe 24 to a turbine (not shown in FIG. 1) located in a building 26 above ground. The turbine and associated components are best shown in FIG. 5 and will be described later. With continued reference to FIG. 1, compressor 20 includes a water intake generally denoted 28, located at an upper level in a stream of water such as a river as shown at 30. In this particular embodiment, the river is shown as having been blocked by a dam 32 although this is not essential.

Compressor 20 includes an upright air compression shaft 34, a horizontal tunnel 36 that extends laterally from the bottom of shaft 34 and in which the chamber 22 is formed, and an upright return shaft 38 at the end of tunnel 36 remote from shaft 34. At its upper end, shaft 38 opens at a water outlet 40 from the compressor through which water is effectively returned to the stream at a lower level than the level of intake 28. The difference in height between intake 28 and outlet 40 of course provides a head for assuring water flow through the compressor.

The shafts 34, 38 and tunnel 36, as well as chamber 22 are formed by conventional mining or tunneling techniques. In this particular embodiment, shaft 34 is shown as being, in effect, lined by a pipe 42 having at its lower end a section 44 which is of progressively increasing cross-sectional area in the downward direction for reducing the velocity of the water as it approaches the lower end of the shaft. However, neither pipe 42 nor section 44 are essential to the satisfactory operation of the compressor, although provision should be made to prevent compressed air escaping back up shaft 34 (see later). Conversely, while tunnel 36 and shaft 38 are shown as being unlined, they could be provided with appropriate linings.

Figure 3:
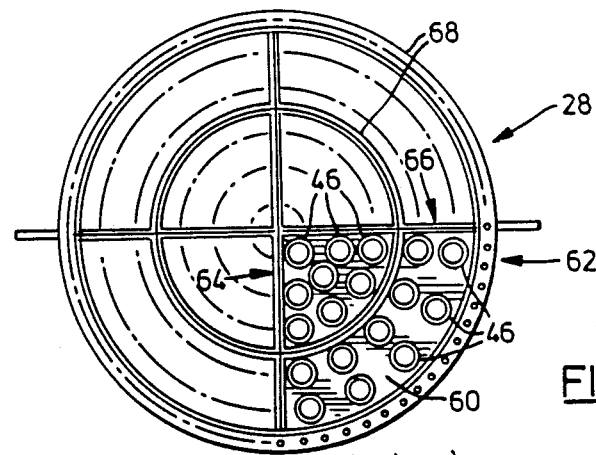
FIG. 3 is a plan view corresponding to FIG. 1.
Figure 2:
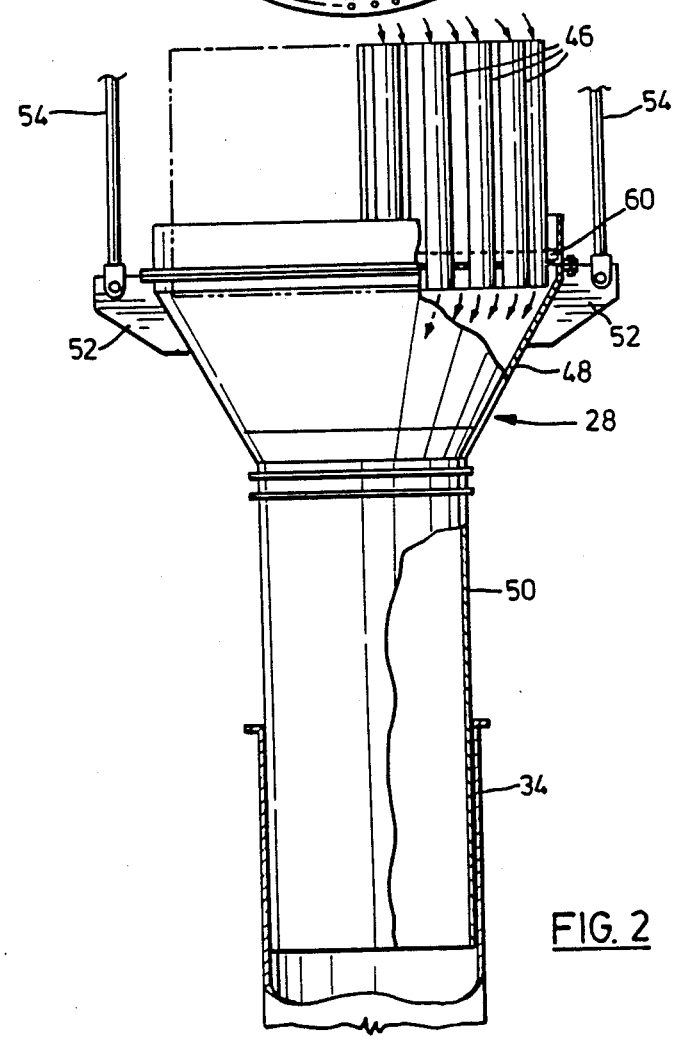
FIG. 2 is a detail side elevational view, partly in section, of the water intake of the plant of FIG. 1.

The water intake to the vertical air compression shaft of the compressor should be designed to entrain air with the water entering the shaft by turbulence, vortex, venturi effects or a combination of such effects. The particular intake used in this embodiment is shown in FIGS. 2 and 3 of the drawings. As can be seen from these views, the intake includes an array of vertically arranged tubes 46 through which water enters a funnel-shaped section 48 at the top of pipe 34. In fact, the funnel-shaped section 48 has a pipe section 50 at its lower end that slides telescopically within the upper end portion of pipe 34. This allows the height of the tubes to be adjusted to different levels of the incoming water stream. Specifically, funnel section 48 is provided with external brackets 52 to which are coupled piston rods 54 of a pair of vertically arranged piston and cylinder units generally indicated at 56 in FIG. 1. The cylinders of these units are fixed to an overhead structure 58 above intake 28 so that the height of the funnel 48 can be adjusted by extending and retracting the piston rods of the respective units. As can be seen from FIGS. 2 and 3, the tubes 46 are carried by a transverse plate 60 that extends across the top of the funnel section 48, so that the tubes move up and down with that section.

As can best be seen from FIG. 3, funnel 48 is of circular shape in plan and the tubes 46 are arranged in four right angle sectors centered on the vertical axis of the funnel. For simplicity of illustration, tubes have been shown in only one of the four sectors. Each of the sectors (denoted 62) is divided into inner and outer segments 64 and 66 respectively each of which includes a series of the tubes 46 carried by an individual segment of plate 60. The individual segments are then supported on an appropriately shaped supporting framework indicated at 68 in FIG. 3.

The intake structure shown in FIGS. 2 and 3 of the drawings results in highly turbulent water flow into the air compression shaft 34 of the compressor, which in turn entrains significant quantities of air with the flowing water. As this air travels down shaft 34 with the water, the air is compressed. The vertical height of shaft 34 will be selected according to the degree of compression required but will typically of the order of several hundred feet (e.g. 200-300). As noted previously, the velocity of the water is slowed somewhat as it approaches tunnel 36 by pipe section 44. A diverter cone 70 is also provided in the tunnel 36 opposite the lower end of shaft 34 to combat erosion of the ground below the tunnel due to the force of the water leaving the shaft. The water then flows along tunnel 36 and the air is allowed to bubble to the surface of the water and collects in chamber 22. The water returns to the surface through shaft 38 as discussed previously.

Chamber 22 should be spaced a sufficient distance from shaft 34 to allow appropriate quantities of air to escape from the water. Otherwise, however, the tunnel can be of any appropriate length commensurate with the required difference in head between the intake 28 and the outlet 40 of the compressor. Within these limits, the length of the tunnel can be selected as appropriate to bypass obstructions in the ground or on the surface between intake 28 and outlet 40.

Tunnel 36 is designed so that the water velocity from the compression shaft 34 is reduced as the water enters chamber 22. This allows the air to rapidly rise to the water surface where the bubble coalesce to form an air pocket. The pipe 42 in shaft 34 is designed so that its lower end section 44 is always below the surface of the water in tunnel 36 to prevent air from escaping back up the compression shaft 34.

The air released in tunnel 36 is stored under pressure in the top of chamber 22. This part of the chamber can be made as large as is required for air storage. Very large quantities of compressed air can be stored for long periods of time. The air in chamber 22 is maintained under pressure by the weight of the water column in the return shaft 38. A longer vertical drop in the return shaft will produce a greater pressure. The pressure in chamber 22 is slightly less than would be predicted by normal methods since some air is dissolved in the water during compression and released in the return shaft 38.

The pipe 24 that conducts the compressed air to the turbine is positioned so that the air is drawn from a high point in chamber 22. A second pipe, denoted 72 in FIG. 1, is located in chamber 22 with its open lower end located at the desired minimum water level in the chamber. Pipe 72 extends (with pipe 24) up the return shaft 38 to a position above the water level in the water stream. Pipe 72 acts as a safety blow-off pipe in the event that more air is being compressed than is consumed. The water level then gradually drops in chamber 22 until the lower end of pipe 72 is exposed, allowing air to escape from the chamber. In effect, this pipe ensures that the water level in the chamber can never drop below a pre-set level.

At the point where the water leaves chamber 22, provision is made for a water seal to prevent air escaping. This seal may be in the form of a U-trap or the return shaft 38 may be arranged to draw its water from the floor of the chamber well below the safety blow-off water line. In the illustrated embodiment, this seal is effectively provided by reducing the height of tunnel 36 so that the top wall is below the water level, as indicated at 36a.

Return shaft 38 is designed so that the velocity of the water is slow enough to allow the air dissolved in the water during compression to be released before the water flows out of the shaft. This results in the recovery of the energy lost in dissolving the air during compression.

The air supplied by the hydraulic air compressor through pipe 24 ranges in temperature from the freezing point of water to the surface temperature of the separation chamber and depends on the time of year and the volume of air produced. The air compression is isothermal since the air is compressed in direct contact with the water, which is providing the compression energy.

Figure 7:
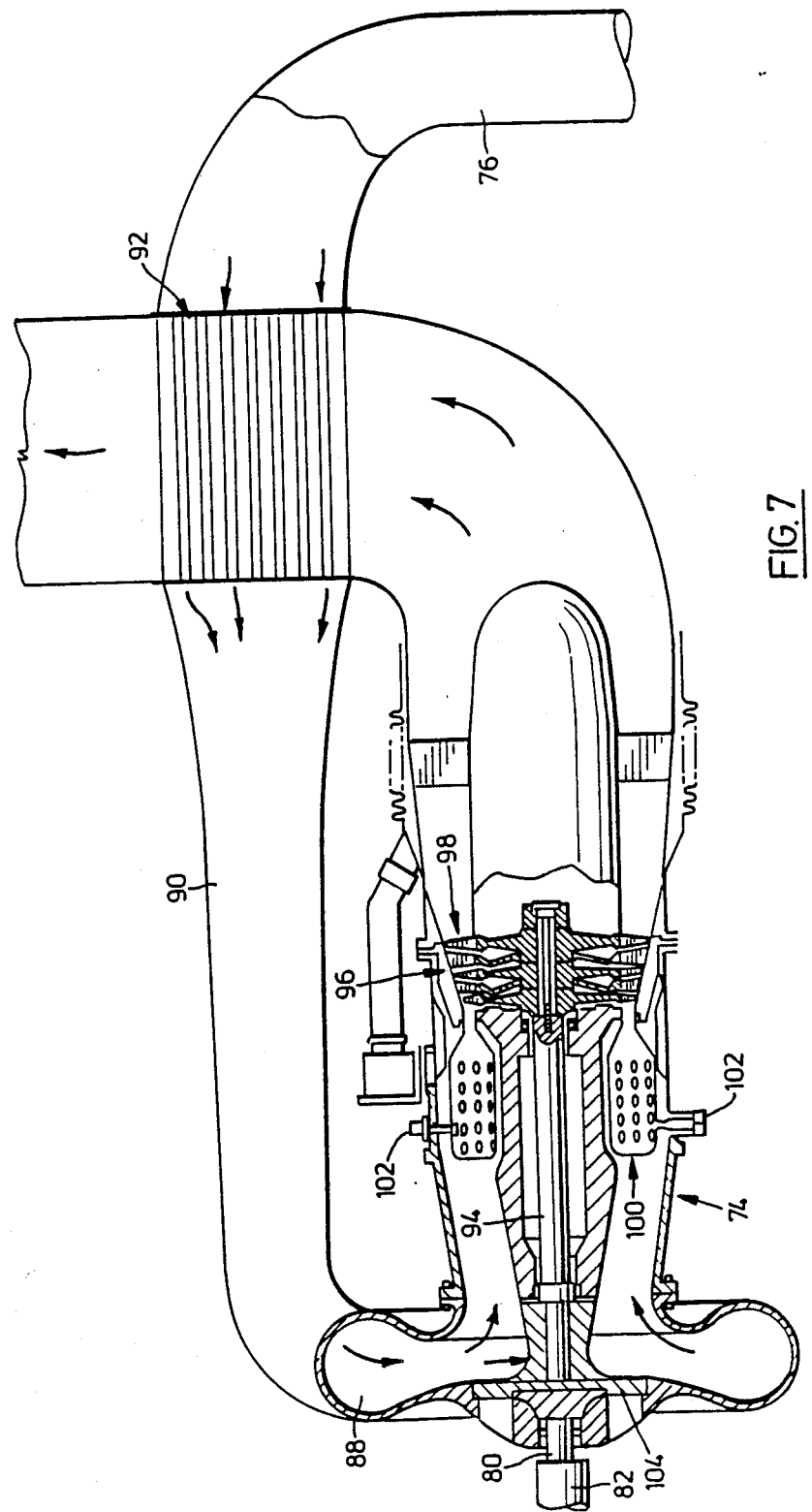
FIG. 7 is a side elevational view corresponding to part of FIG. 5, shown partly in section.

FIGS. 5 to 7 illustrate the turbine and associated components of the power plant. Referring first to FIG. 5 the turbine itself is generally indicated by reference numeral 74. An inlet pipe for compressed air from the hydraulic air compressor 20 is denoted 76 and an exhaust outlet from the turbine is indicated at 78. The turbine has a power output shaft 80 connected by a coupling 82 to an electrical generator 84 by way of a gearbox 86. The generator and gearbox are essentially conventional and will therefore not be described in detail.

FIG. 7 shows the internal structure of the turbine. The turbine has a compressed air inlet 88 that is connected by a manifold 90 with the compressed air inlet pipe 76 via a gas-to-gas heat exchanger 92. Heat exchanger 92 is also connected between the manifold 90 and the turbine exhaust 78 so that incoming compressed air from pipe 76 will be preheated by the exhaust gases. Heat exchanger 92 will be a high efficiency unit (e.g. 90-94%) with a very large surface area. Typically, the exhaust gas from the turbine will be at 600°-1000° F. and the the air will be at between 32° and 75° F. The large temperature differential between the compressed air intake and the exhaust gases allows the heat exchanger to efficiently increase the compressed air to 600°-800° F. and reduce the exhaust air temperature to 75°-200° F. This heat recovery from the exhaust gases is important to the efficient operation of the power plant since it represents a reduction in the fuel required to heat the compressed air within the turbine 74 (as will be described).

Turbine 74 has a rotary shaft 94 that carries driven turbine blades only, indicated at 96. The turbine blades are located in an expansion chamber 98 immediately downstream of a combustion chamber 100 provided with a series of fuel burners 102. In this particular embodiment, the turbine 74 is a gas turbine and the burners 102 are essentially gas fuel injectors coupled to an external gas supply (not shown). Compressed air from inlet 88 is delivered to the combustion chamber 100 with fuel from the injectors 102. The fuel burns and the combustion gases expand into chamber 98, driving the turbine blades in rotation and, with the blades, shaft 94. At its end remote from the blades 96, shaft 94 extends through the turbine casing and is coupled with output shaft 80 and coupling 82 (FIG. 5). The adjacent end of the turbine casing incorporates a balance piston 104 that is subjected to the effect of the high pressure compressed air within inlet 88 in a direction opposite to the direction of the thrust imposed on the turbine blades 96. In other words, the balance piston is used to counteract the axial thrust on shaft 94 that occurs due to the effect of the expanding combustion gases on the turbine blades 96. This avoids the need for complex thrust bearing arrangements that would otherwise be required and that can involve complex heat dissipation problems.

The principal components of the turbine, namely the turbine blades and shaft (rotor) as well as the combustion chamber and injectors are of the form conventionally provided in gas turbines. However, the turbine has no compressor blades as found in conventional gas turbines.

It should be noted that, although an axial-flow turbine has been illustrated, a radial flow turbine could also be used, again with no compressor stage.

Fuels used in the turbine can range from oil to coal gas and include natural gas and hydrogen.

Figure 4:
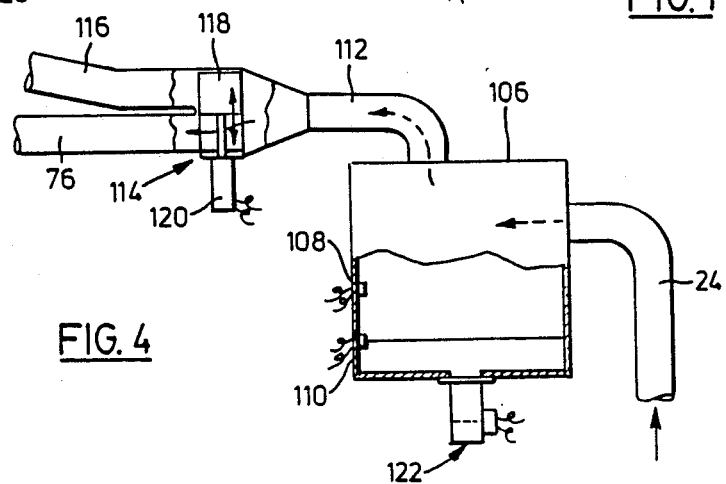
FIG. 4 is a side elevational view, partly in section, of part of the air control system of the plant.

FIG. 4 illustrates a safety air control device that is incorporated in the air line between the hydraulic air compressor and the turbine. This device is designed to prevent water entering the turbine if all of the air should be drawn from chamber 22 (FIG. 1). If high pressure water were allowed to suddenly replace the air in pipe 24, the water could seriously damage the turbine and associated equipment. The device shown in FIG. 4 is essentially a safety device designed to prevent this happening.

As shown in that view, compressed air flowing through pipe 24 from the air compressor is delivered to a reservoir 106 that has upper and lower liquid level sensors 108 and 110 respectively. An outlet pipe 112 from the top of the reservoir is connected through a valve 114 to the inlet pipe 76 to the turbine (FIG. 7) or to an exhaust pipe 116. Valve 114 includes a piston 118 that is operated by a solenoid 120. In the upper position of the piston shown in FIG. 4, the exhaust is blocked and air entering the valve from pipe 112 is delivered to the turbine. This of course would be the normal position of the valve. If the piston 118 is moved to its lower position, any fluid and air will of course be delivered to exhaust and the turbine will be protected. Solenoid 120 may be controlled by the liquid level sensors 108 and 110 and will be operated to move the piston to its lower position in the event that sensor 108 or 110 detects liquid. Pressure sensors may also be used to detect the drop in pressure in pipe 24 which occurs when a pulse of fluid moves up the pipe. The pressure sensor would also control solenoid 120.

Reservoir 106 is provided with a discharge valve 122 for draining the reservoir, which is controlled by level sensor 110.

In a commercial installation, the device shown in FIG. 4 (or an equivalent) would form part of a comprehensive air control system that could include, for example, air/water separators, mass sensors, high-speed valves, explosive release valves and modulating valves. However, for the sake of simplicity, these components have not been shown in the drawings.

The air/water separators would remove small amounts of water from the compressed air supplied by the hydraulic air compressor.

Mass sensors would be used to detect large amounts of water coming from the compressor and could include a device of the form shown in FIG. 4. High speed valves would be used as valve 114, or an equivalent valve used to redirect the air, air/water mixture or water in the event that water in excess of the capabilities of the separators appears in the pipe 24. These valves can also be used to bring the turbine to a rapid shutdown in the event of a full-load rejection of the generator. The flow must be redirected since rapid cut-off could result in a destructive water hammer effect in the pipe from the compressor. The high speed valves are required to redirect the flow from full on to fully redirected in less than 0.5 seconds.

Explosive release valves provide a backup to the high speed valves in case of failure. Explosive valves can be used to instantly release the pressure in the air supply pipe 24.

A modulating valve (not shown) would be used to control the flow of air under normal operating conditions and could be used to throttle the power output from the plant by reducing the flow of air. The reduction of air flow must of course be accompanied with a co-ordinated reduction in fuel flow to the turbine.

Figure 8:
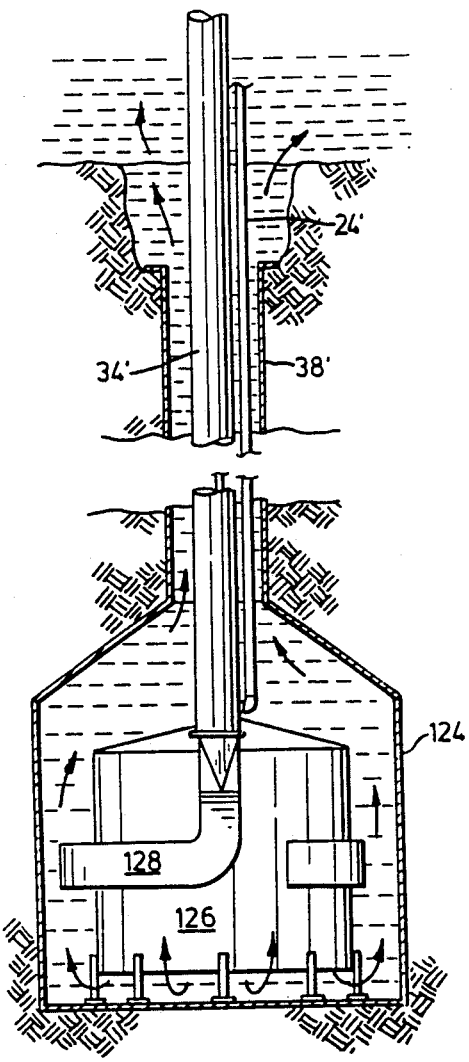
FIG. 8 is a vertical sectional view through an alternative form of hydraulic air compressor.
Figure 9:
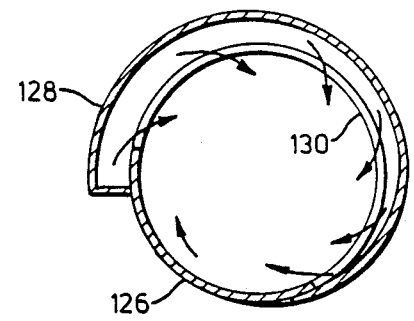
FIG. 9 is a side view of the lower part of the compressor shown in FIG. 8.
Figure 10:
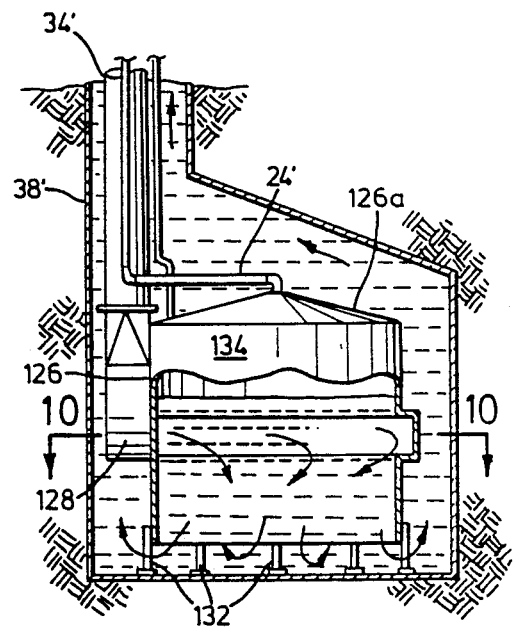
FIG. 10 is a sectional view on line 10—10 of FIG. 9.

FIGS. 8 to 10 illustrate a form of hydraulic air compressor that may be used in place of the compressor shown in FIG. 1 and in which the compression shaft and return shaft are essentially disposed at the same location; in other words, there is no need for significant horizontal separation between the two shafts as is the case in the compressor of FIG. 1. Primed reference numerals have been used in FIGS. 8 to 10 to denote parts that correspond with parts shown in FIG. 1.

Referring first to FIG. 8, the compressor has a vertical compression shaft 34' in the form of an inner pipe 34' disposed within an outer pipe 38' that forms the return shaft. Pipe 34' receives water from an upper, upstream location through an intake (not shown) designed to entrain air. Pipe 38' returns the water to the stream at a lower level. Disposed alongside pipe 34' within pipe 38' is a compressed air supply pipe 24'.

At an appropriate depth below ground, the outer pipe 38' communicates with an outer tank 124 that encloses an inner tank 126 forming the air separation and storage chamber of the compressor.

Within the outer chamber 124, the air compression pipe 34' communicates with the inner tank 126 by way of a scroll-shaped intake duct 128 which is best shown in FIG. 10. As can be seen from this view, water entering the duct from pipe 34' flows from the duct through an intake slot 130 in a vortex-type flow pattern into tank 126. The lower end of tank 126 is open as best seen in FIG. 9 and the tank is supported above the bottom of the outer tank 124 on legs 132 so that the water then flows out into the outer tank and, from there, into the return shaft 38'.

The swirling action imparted to the water due to the shape of duct 128 assists in liberation of air from the water. The air bubbles to the water surface 134 and accumulates in the upper portion of tank 126. The tank has a conical shaped top 126a to the center of which is connected the air supply pipe 24' for take-off of compressed air.

In summary, a power plant of the form provided by the invention is believed to offer advantages in terms of efficiency of power generation as compared with conventional power generation techniques. For example, compression of air by using the inherent energy naturally available in flowing water avoids the need to use fuel for air compression such as is the case in, for example, industrial gas turbines where as much as two thirds of generated shaft horsepower is used to drive an air compressor. In the power plant of the invention, since the hydraulic air compressor is supplying all of the combustion air at the appropriate pressure and the output turbine is still producing its full rated power, overall efficiency is high. Recovery of what would otherwise be waste heat in the turbine exhaust and utilization of that heat to preheat the compressed also reduces supplementary fuel requirements. It has been calculated that, in a power plant of the form provided by the invention a turbine that would be equivalent to a conventional 1000 kilowatt turbine would be able to produce 2500 kilowatts or more of power.

It should finally be noted that the preceding description relates to particular preferred embodiments of the invention and that many modifications are possible within the broad scope of the claims. Some of those modifications have been indicated previously and others will be apparent to a person skilled in the art.

The power plant may also be adapted for bi-directional operation, for example by providing the water intake and outlet of the hydraulic air compressor with vertically adjustable collars that can be raised and lowered on a cyclical basis so that water can flow through the compressor alternately in opposite directions. Such an arrangement would allow the compressor to be used in tidal waters where the direction of water flow reverses on a cyclical basis.

It should finally be noted that the air compression shaft of the air compressor need not be vertically disposed. In some locations, it may be desirable to employ an inclined air compression shaft. The degree of inclination that is permissible will vary from site to site but will generally depend on the water velocity down the shaft being greater than the bubble rise rate.

I claim:

1. A power plant, comprising:

a hydraulic air compressor including: a water intake in a stream of water at an upper level and a water outlet at a lower level in said stream, said intake being adapted to entrain air with water entering said intake; an air compressor shaft in the ground, said shaft communicating at an upper level with said intake and permitting entrained air to be compressed by water moving downward in said shaft; an air separation and storage chamber in the ground communicating with a lower end of said shaft and in which air is allowed to bubble to the surface of the water and is trapped in the chamber above the water; a return shaft for delivering water from said chamber to said water outlet in the water stream; and a compressed air outlet from said chamber;

A turbine having a compressed air inlet; burner means for heating said compressed air; an expansion chamber for receiving said heated compressed air; an exhaust outlet downstream of said expansion chamber; and a rotary shaft carrying driven turbine blades, said blades being located in said expansion chamber for driving by hot gases expanding in said chamber;

means for preventing water flow to said turbine in the event that water enters said air outlet of the hydraulic air compressor;

heat exchanger means coupled between said turbine exhaust outlet and said air control means for preheating compressed air entering said compressed air inlet of the turbine; and, generator means coupled to said rotary turbine shaft; wherein said tubine is an axial-flow gas turbine;

and wherein said rotary shaft of the turbine has a first end portion at which said turbine blades are located, and a second end portion, said air inlet of the turbine being disposed between said first and second end portions and said second end portion of the shaft being provided with a balance piston for counteracting axial thrust exerted on the shaft by combustion gases acting on said turbine blades.

2. A power plant as claimed in claim 8, wherein the hydraulic air compressor is adapted to produce compressed air at a pressure suitable for direct use by the turbine, said compressed air being delivered directly to said burner means of the turbine without further compression.

3. A power plant as claimed in claim 8, wherein said hydraulic air compressor is of a type in which said air compression shaft and said return shaft are disposed at horizontally spaced locations in the ground and are connected at their lower ends by a tunnel by which said air separation and storage chamber communicated with said lower end of the air compression shaft.

4. A power plant as claimed in claim 1, wherein said means for preventing water flow to said turbine comprises a reservoir between said air compressor and said turbine, the reservoir having an inlet communicating with said compressed air outlet from the air separation and storage chamber of the compressor, and an outlet, and valve means adapted to couple said outlet selectively with one of said turbine air inlet and an exhaust outlet, said valve being operable to close said turbine inlet and place said exhaust in communication with the reservoir in the event that an abnormal water level is detected in said reservoir or inlet pipe.

5. A power plant, comprising:

a hydraulic air compressor including: a water intake in a stream of water at an upper level and a water outlet at a lower level in said stream, said intake being adapted to entrain air with water entering said intake; and air compression shaft in the ground, said shaft communicating at an upper level with said intake and permitting entrained air to be compressed by water moving downward in said shaft; and air seperation and storage chamber in the ground communicating with a lower end of said shaft and in which air is allowed to bubble to the surface of the water and is trapped in the chamber above the water; a return shaft for delivering water from said chamber to said water outlet in the water stream; and a compressed air outlet from said chamber;

a turbine having a compressed air inlet; burner means for heating said compressed air; an expansion chamber for receiving said heated compressed air; and exhaust outlet downstream of said expansion chamber; and a rotary shaft carrying driven turbine blades, said blades being located in said expansion chamber for driving by hot gases expanding in said chamber;

means for preventing water flow to said turbine in the event that water enters said air outlet of the hydraulic air compressor;

heat exchanger means coupled between said turbine exhaust outlet and said air control means for preheating compressed air entering said compressed air inlet of the turbine; and, generator means coupled to said rotary turbine shaft; wherein said means for preventing water flow to said turbine comprises a reservoir between said air compressor and said turbine, the reservoir having an inlet communicating with said compressed air outlet from the air separation and storage chamber to the compressor, and an outlet, and valve means adapted to coupled said outlet selectively with one of said turbine air inlet and an exhaust outlet, said valve being operable to close said turbine inlet and place exhaust in communication with the reservoir in the event that an abnormal water level is detected in said reservoir or inlet pipe.

6. A power plant as claimed in claim 5, wherein said turbine is an axial-flow gas turbine.

7. A power plant as claimed in claim 6, wherein said rotary shaft of the turbine has a first end portion at which said turbine blades are located, and a second end portion, said air inlet of the turbine being disposed between said first and second end portions and sad second end portion of the shaft being provided with a balance piston for counteracting axial thrust exerted in the shaft by combustion gases acting on said turbine blades.

8. A power plant as claimed in claim 5, wherein the hydraulic air compressor is adapted to produce compressed air at a pressure suitable for direct use by the turbine, said compressed air being delivered directly to said burner means of the turbine without further compression.

9. A power plant as claimed in claim 5, wherein said hydraulic air compressor is of a type in which said air compression shaft and said return shaft are disposed at horizontally spaced locations in the ground and are connected at their lower ends by a tunnel by which said air separation and storage chamber communicates with said lower end of the air compression shaft.

* * * * *